United States Patent
Chen et al.

(10) Patent No.: US 11,310,526 B2
(45) Date of Patent: Apr. 19, 2022

(54) HARDWARE FRIENDLY CONSTRAINED MOTION VECTOR REFINEMENT

(71) Applicant: MEDIATEK INC., Hsinchu (TW)

(72) Inventors: Chun-Chia Chen, Hsinchu (TW);
Zhen-Yen Lai, Hsinchu (TW);
Chih-Wei Hsu, Hsinchu (TW);
Tzu-Der Chuang, Hsinchu (TW);
Ching-Yeh Chen, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 0 days.

(21) Appl. No.: 16/248,452

(22) Filed: Jan. 15, 2019

(65) Prior Publication Data

US 2019/0238883 A1    Aug. 1, 2019

Related U.S. Application Data

(60) Provisional application No. 62/740,470, filed on Oct. 3, 2018, provisional application No. 62/723,014, filed
(Continued)

(51) Int. Cl.
*H04N 19/513*    (2014.01)
*H04N 19/105*    (2014.01)
(Continued)

(52) U.S. Cl.
CPC ......... *H04N 19/521* (2014.11); *H04N 19/105* (2014.11); *H04N 19/139* (2014.11);
(Continued)

(58) Field of Classification Search
None
See application file for complete search history.

(56) References Cited

U.S. PATENT DOCUMENTS

| 2013/0208799 A1* | 8/2013 | Srinivasamurthy .... H04N 19/52 375/240.16 |
| 2018/0359483 A1* | 12/2018 | Chen ................... H04N 19/176 |
| 2018/0376166 A1* | 12/2018 | Chuang ................. H04N 19/82 |

FOREIGN PATENT DOCUMENTS

| CN | 101325710 A | 12/2008 |
| CN | 102685504 A | 9/2012 |

(Continued)

OTHER PUBLICATIONS

Hamza AM, Abdelazim A, Ait-Boudaoud D. Pixel decimation of RD-cost functions in the HEVC encoder. Electronic Imaging. Feb. 14, 2016;2016(2):1-5. (Year: 2016).*

(Continued)

*Primary Examiner* — Clifford Hilaire
(74) *Attorney, Agent, or Firm* — Oblon, McClelland, Maier & Neustadt, L.L.P.

(57) ABSTRACT

A video codec that encodes or decodes video sequences using decoder-side motion vector refinement is provided. The video codec identifies a first motion vector and a second motion vector for coding a current block of pixels of a current video frame in the video sequence. The video codec determines whether to perform motion vector refinement for the current block of pixels based on a comparison between a linear dimension of the current block of pixels and a threshold. When motion vector refinement is performed, the video codec refines the first and second motion vectors to minimize a distortion cost and codes the current block of pixels by using the refined first and second motion vectors. When motion vector refinement is not performed, the video codec codes the current block of pixels by using the identified first and second motion vectors.

10 Claims, 12 Drawing Sheets

Related U.S. Application Data on Oct. 3, 2018, provisional application No. 62/622,234, filed on Jan. 6, 2018.

(51) Int. Cl.
*H04N 19/139* (2014.01)
*H04N 19/176* (2014.01)
*H04N 19/573* (2014.01)
*H04N 19/147* (2014.01)
*H04N 19/567* (2014.01)

(52) U.S. Cl.
CPC ......... *H04N 19/176* (2014.11); *H04N 19/573* (2014.11); *H04N 19/147* (2014.11); *H04N 19/567* (2014.11)

(56) References Cited

FOREIGN PATENT DOCUMENTS

EP          3264769 A1    1/2018
WO    WO 2017164645 A2   9/2017

OTHER PUBLICATIONS

China National Intellectual Property Administration, International Search Report and Written Opinion for International Patent Application No. PCT/CN2019/073179, dated Apr. 22, 2019.
Xu Chen et al., Decoder-Side Motion Vector Refinement Based on Bilateral Template Matching, Joint Video Exploration Team (JVET) of ITU-T SG 16 WP 3 and ISO/IEC JTC 1/SC 29/WG 11 4th Meeting, Chengdu, China, Oct. 21, 2016.

\* cited by examiner

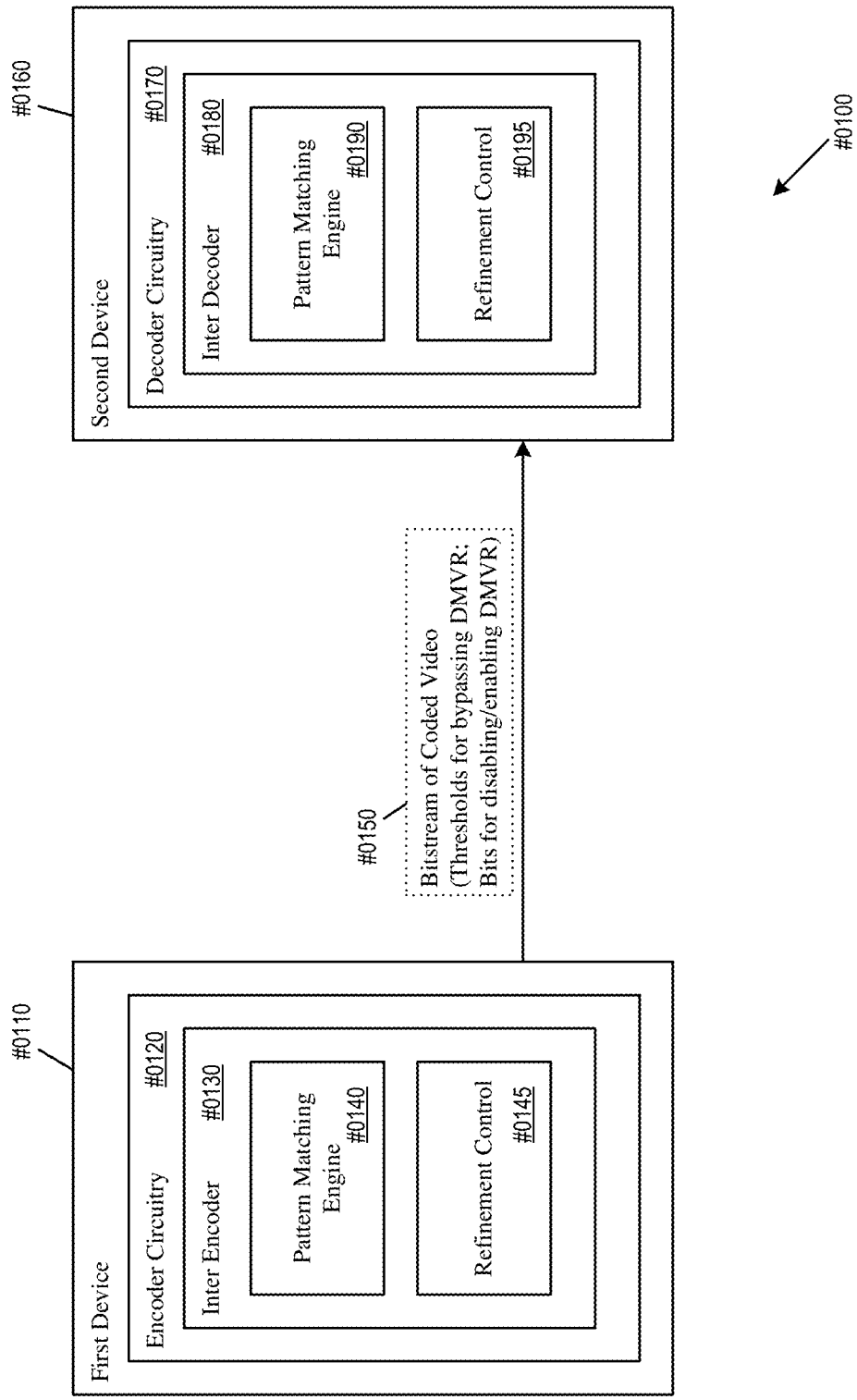
FIG. #01

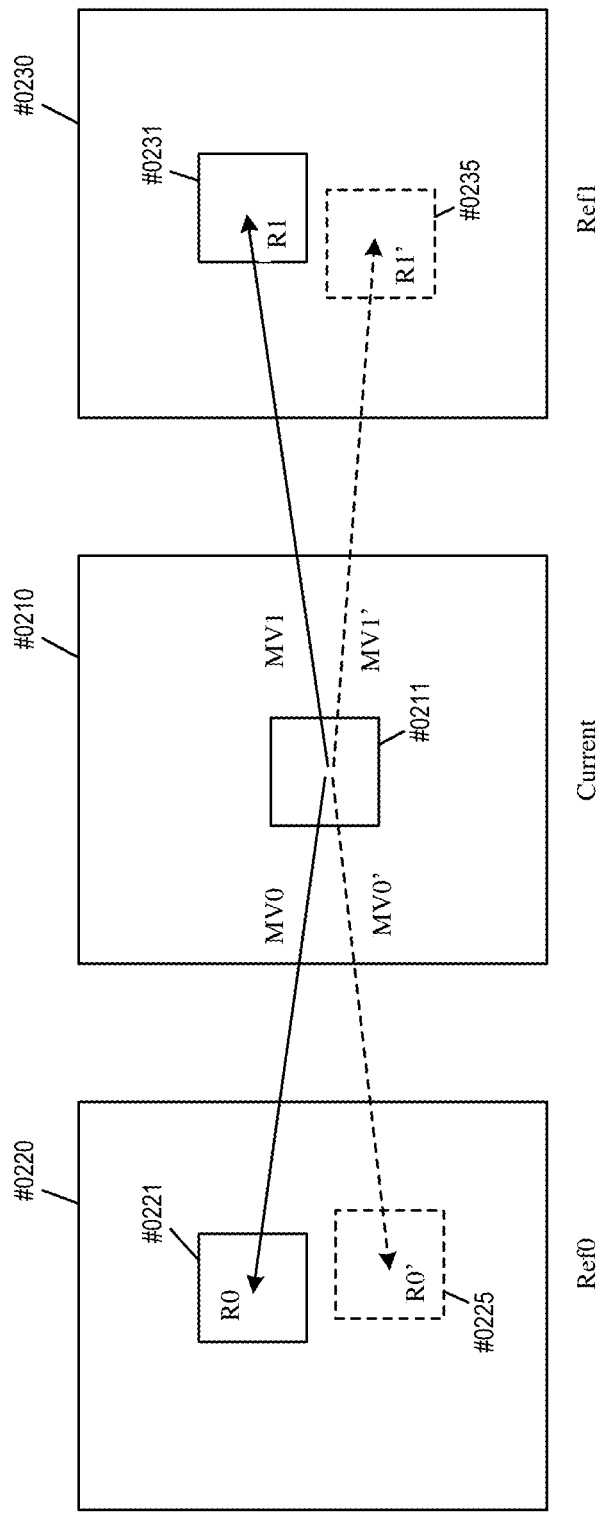
FIG. #02a

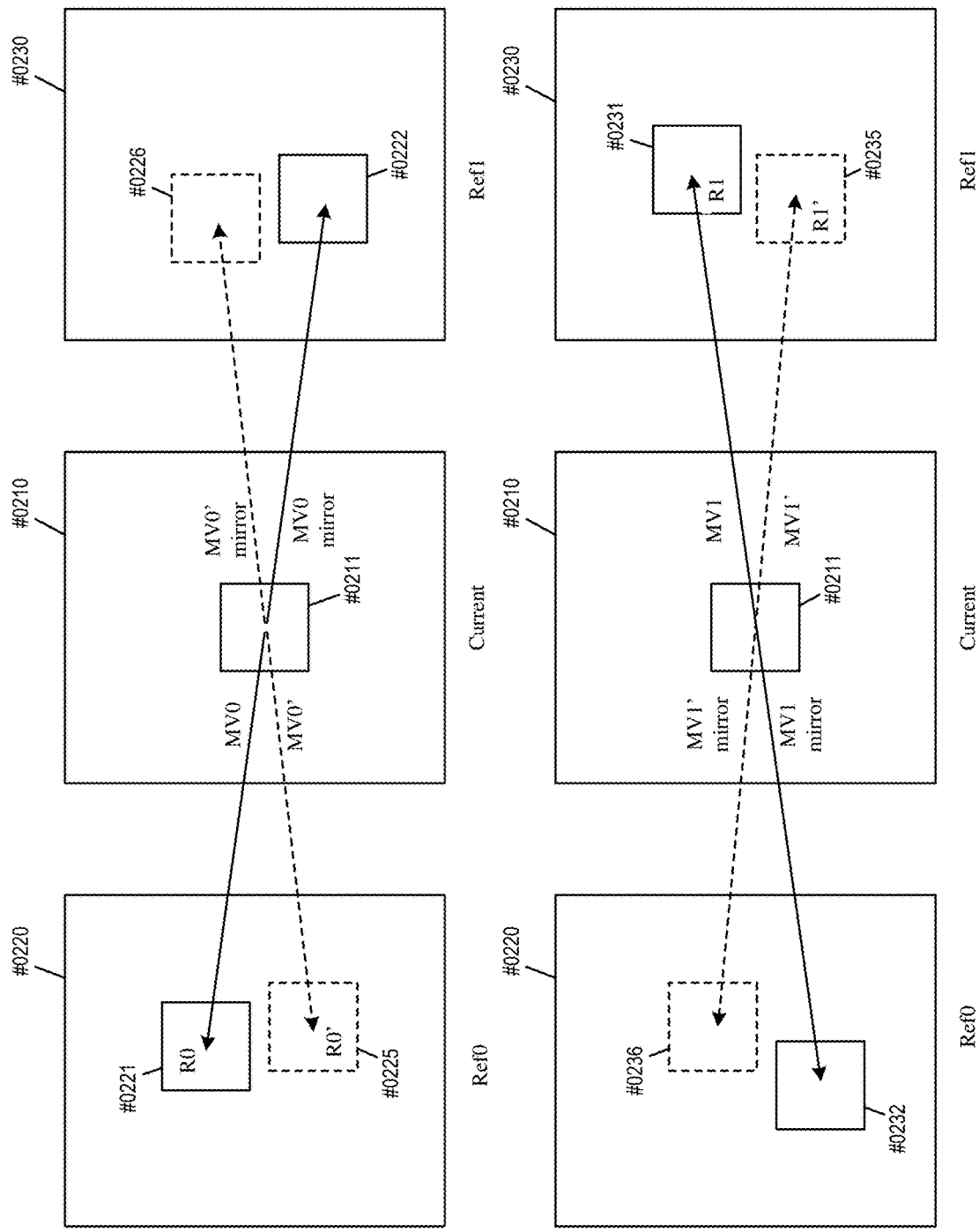
FIG. #02b

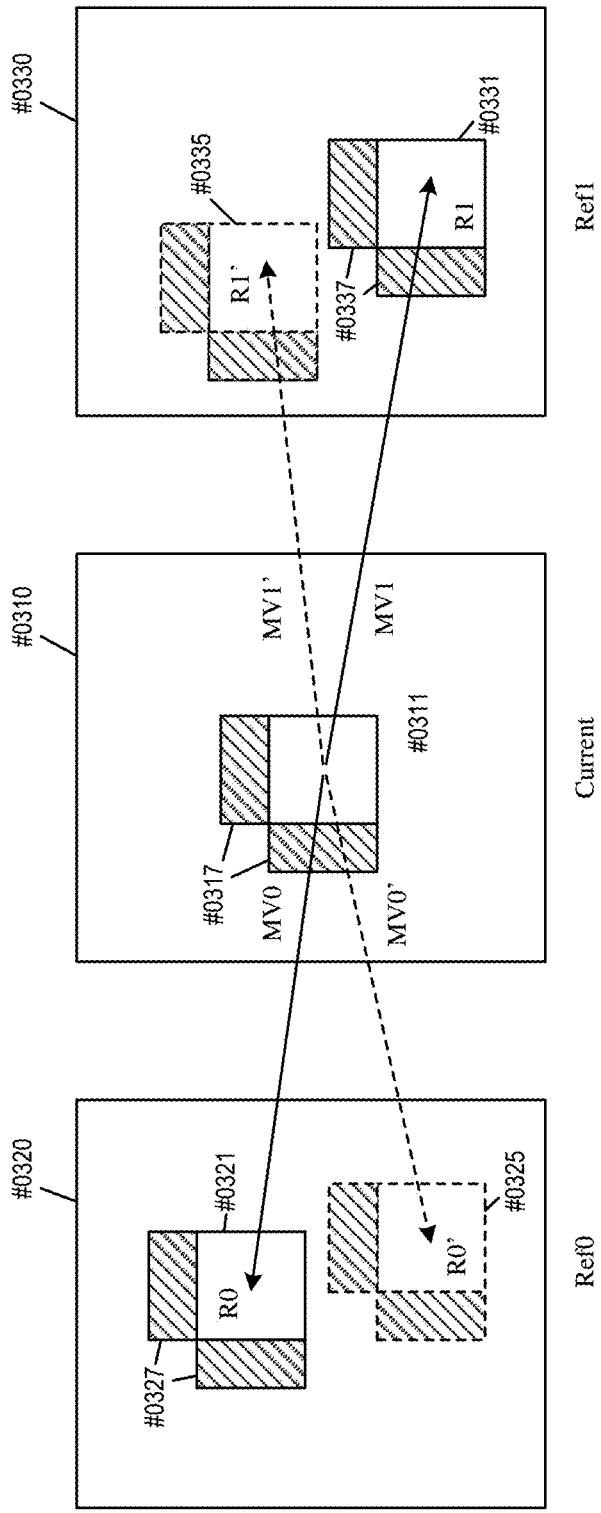
FIG. #03

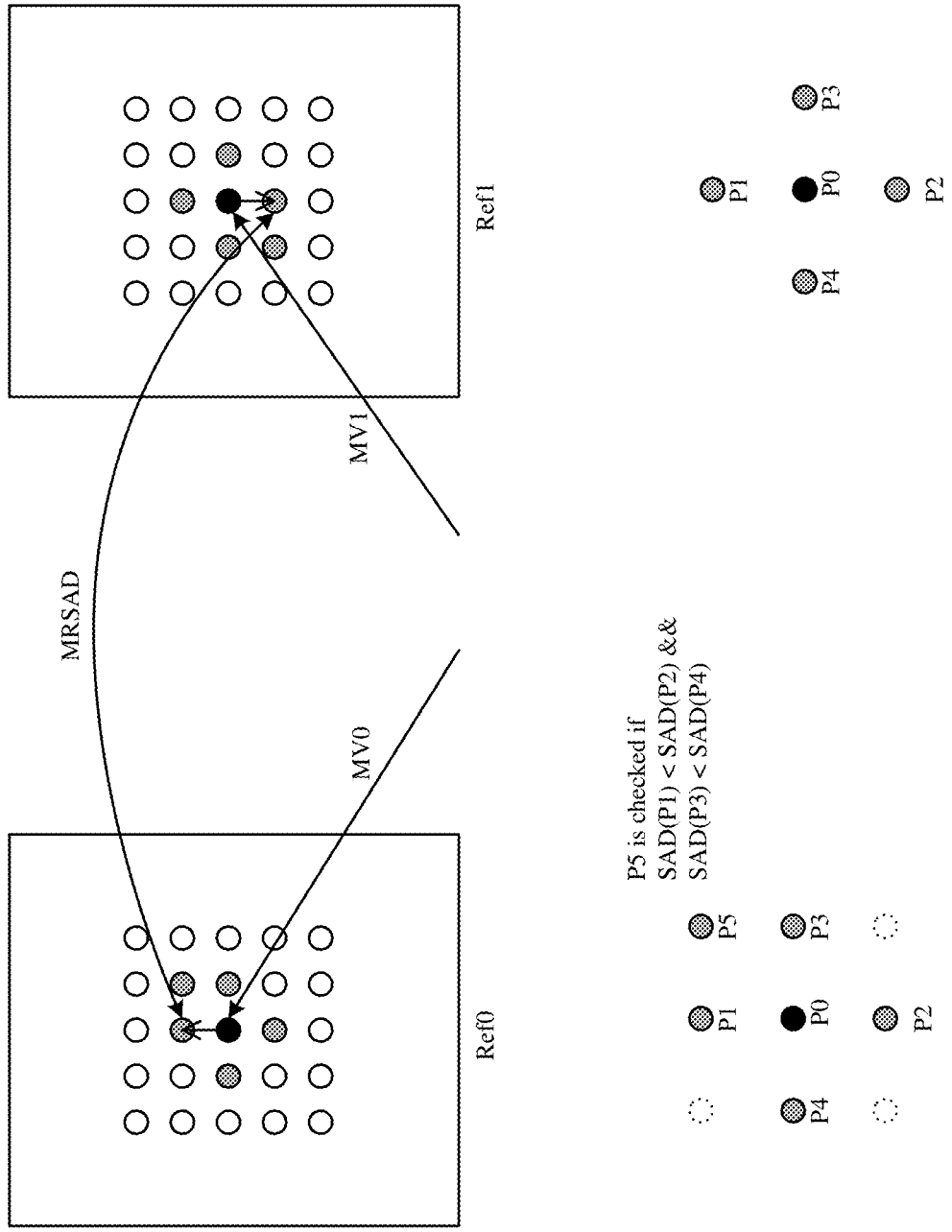
FIG. #04

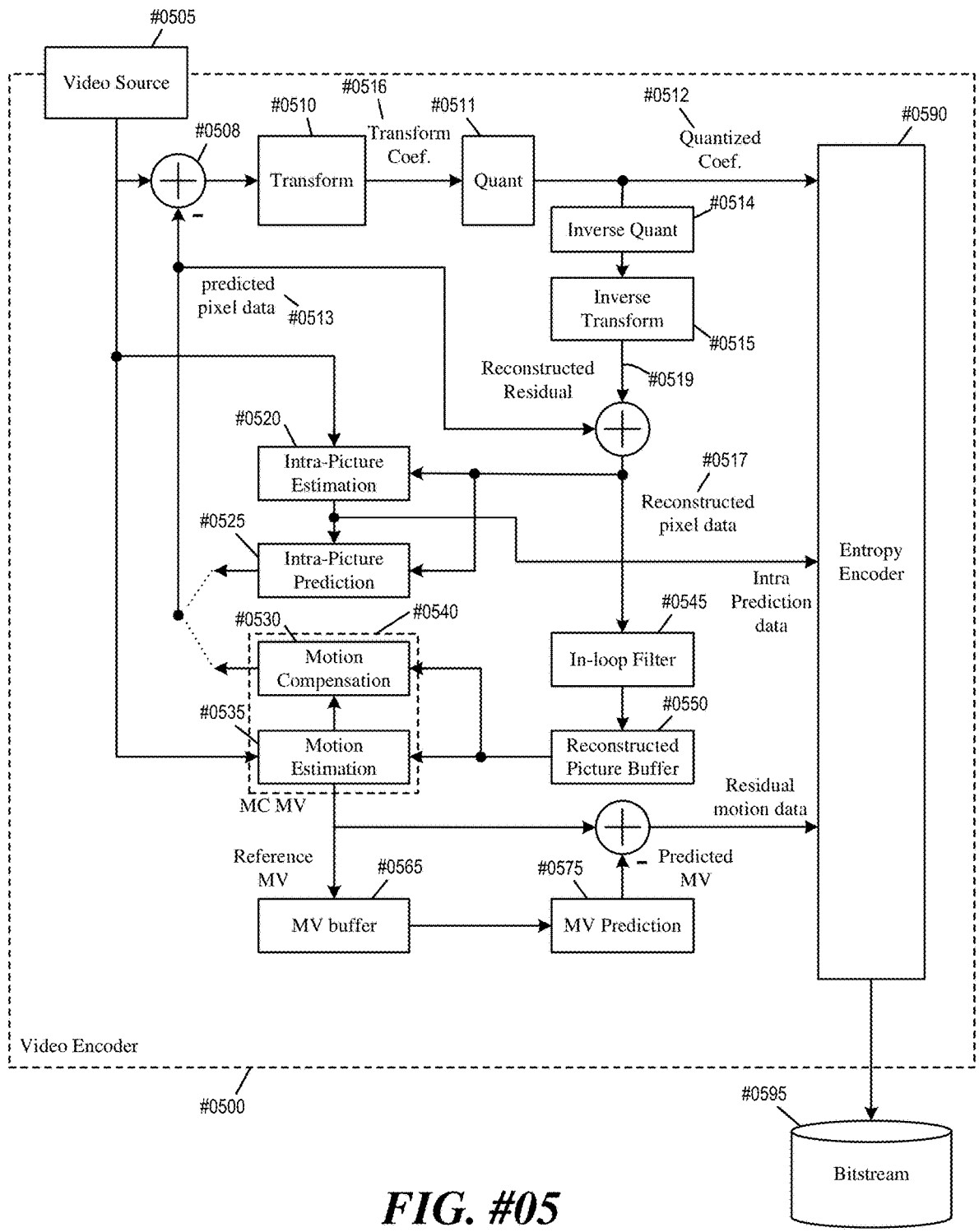
FIG. #05

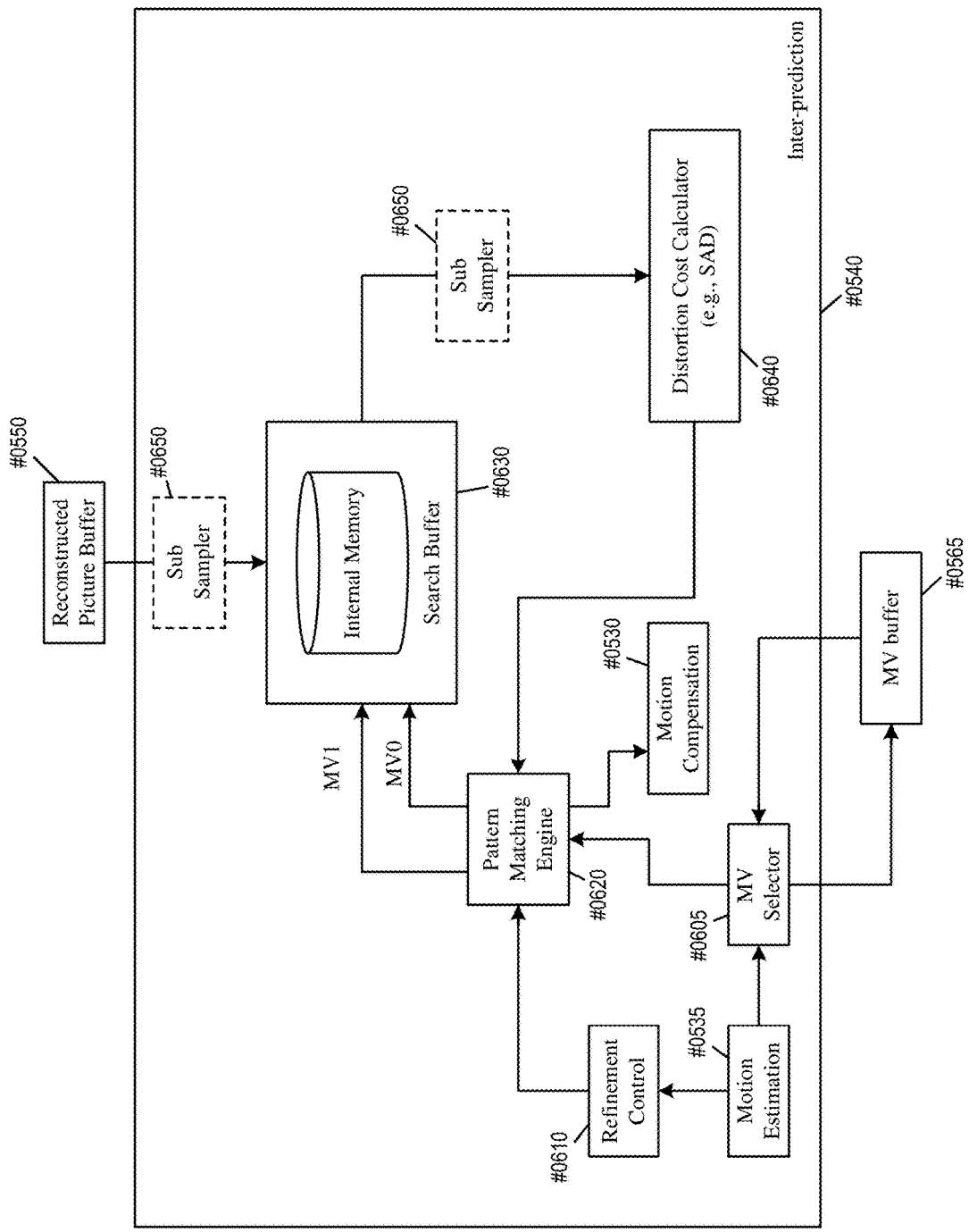
FIG. #06

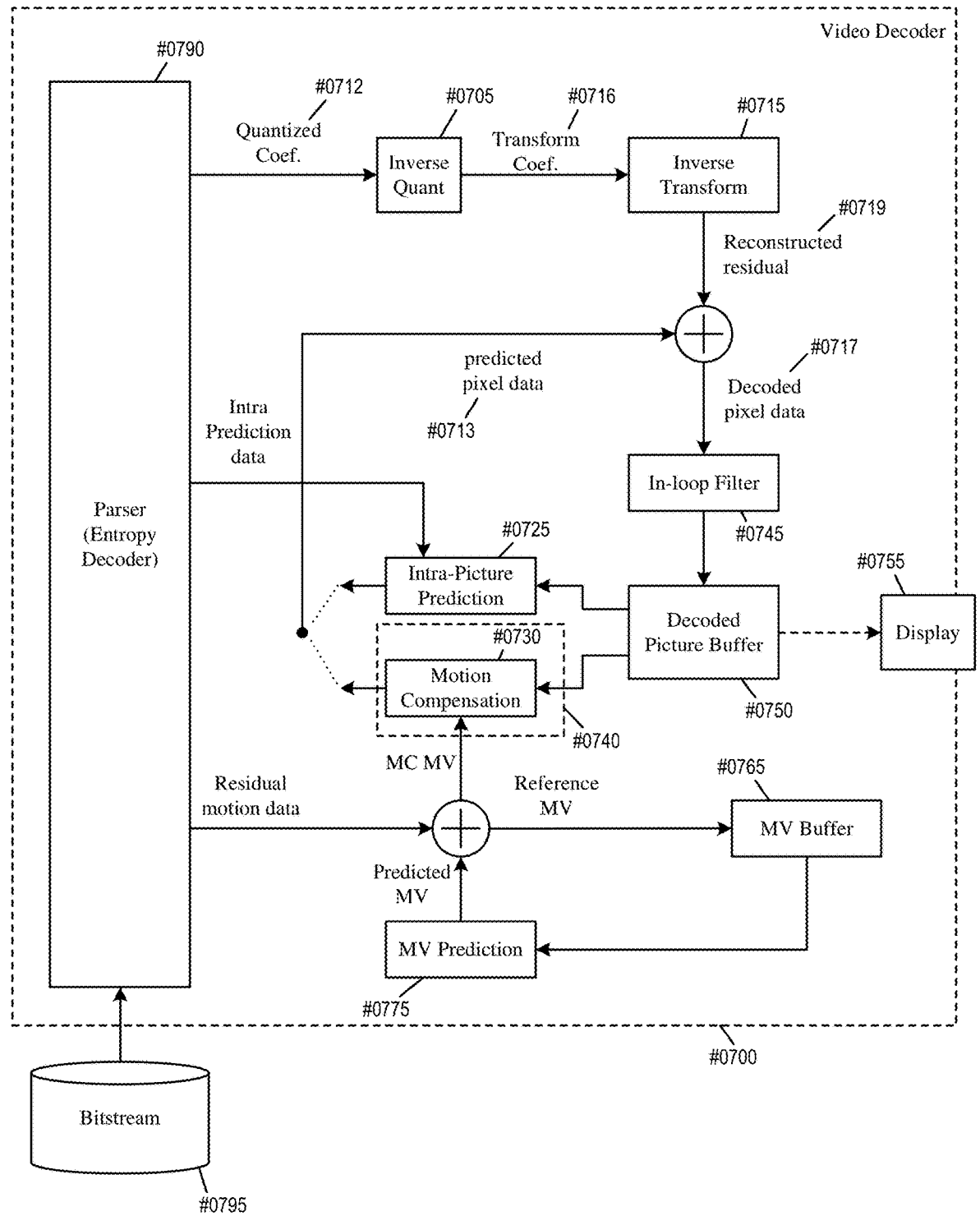
FIG. #07

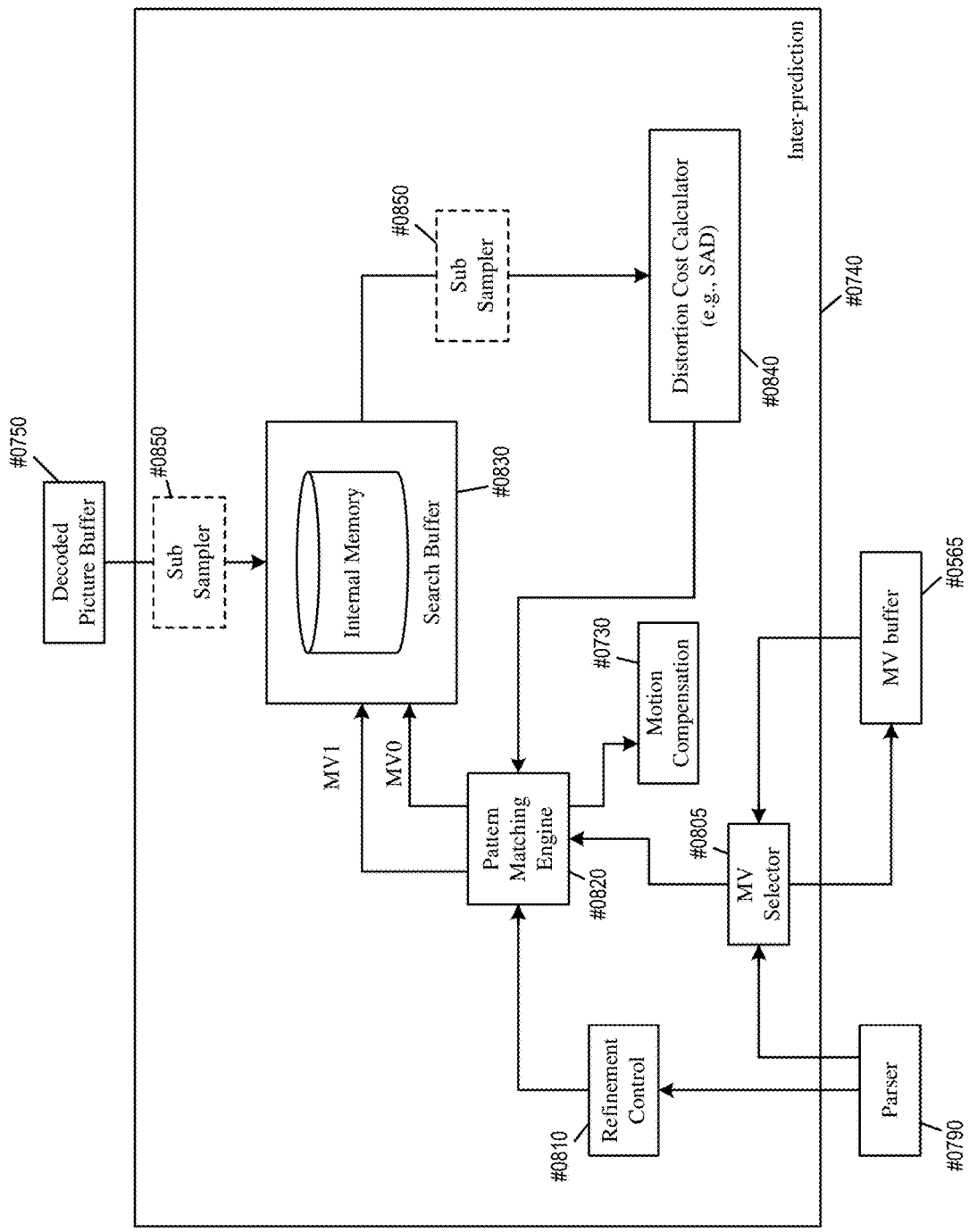
FIG. #08

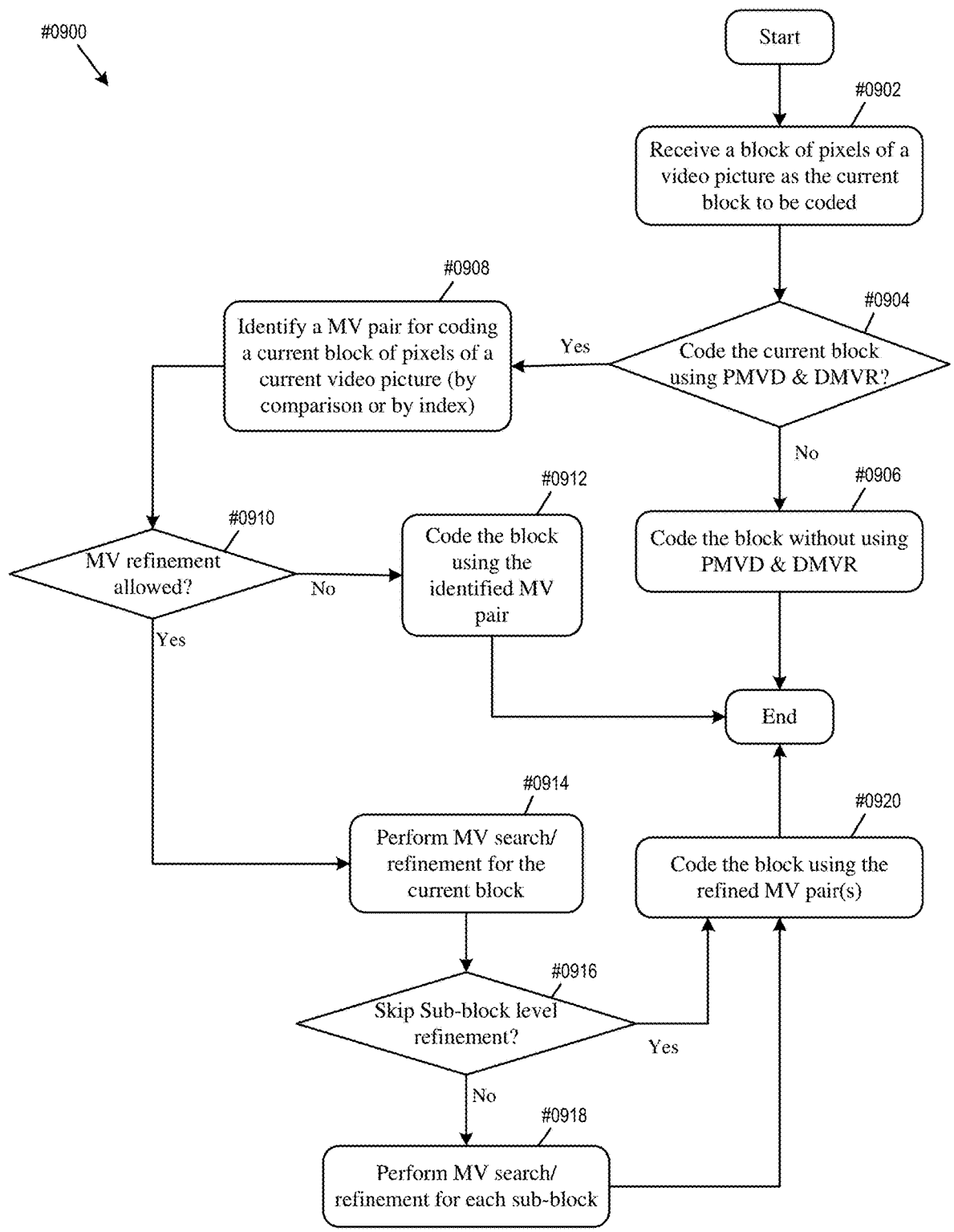
FIG. #09a

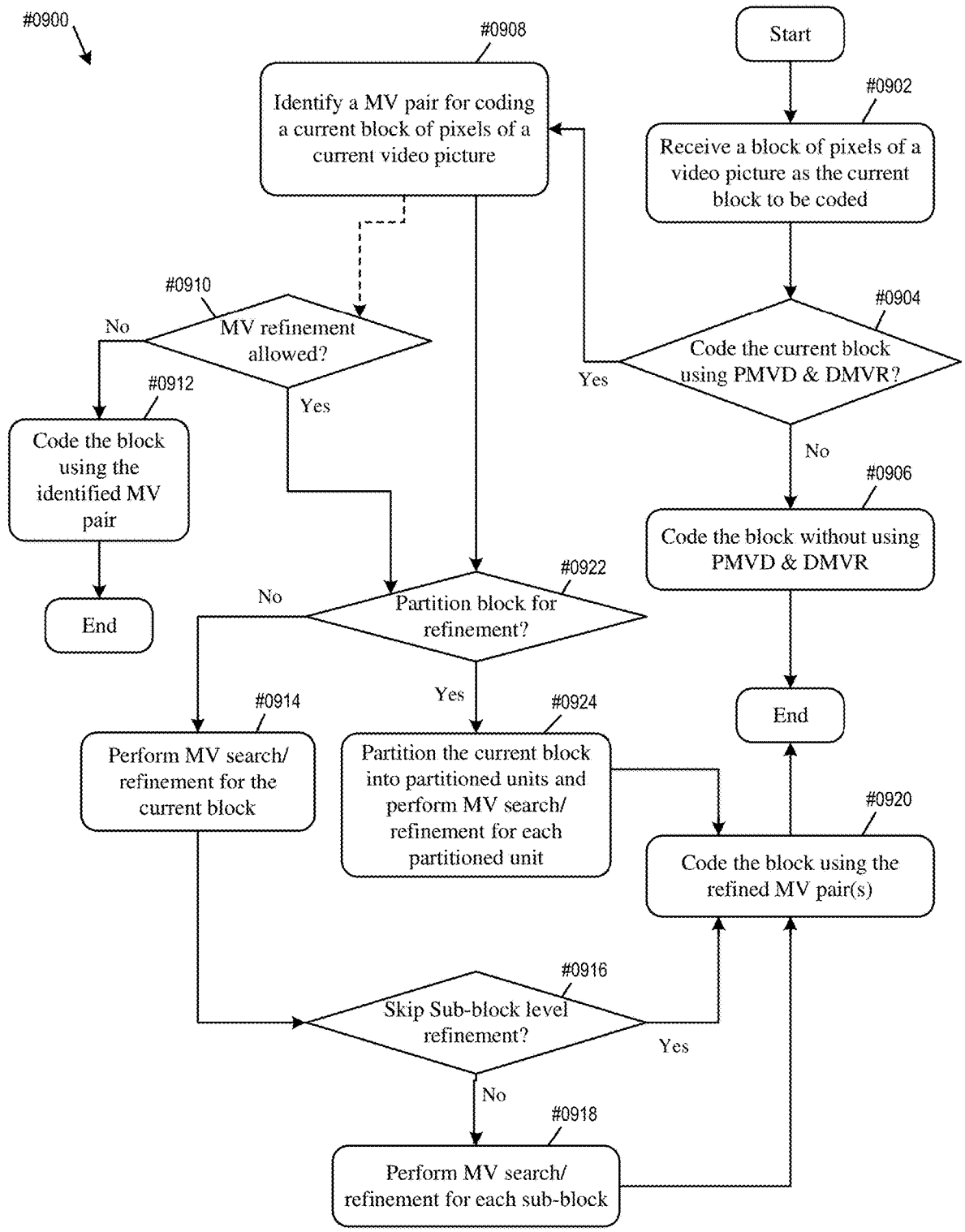
FIG. #09b

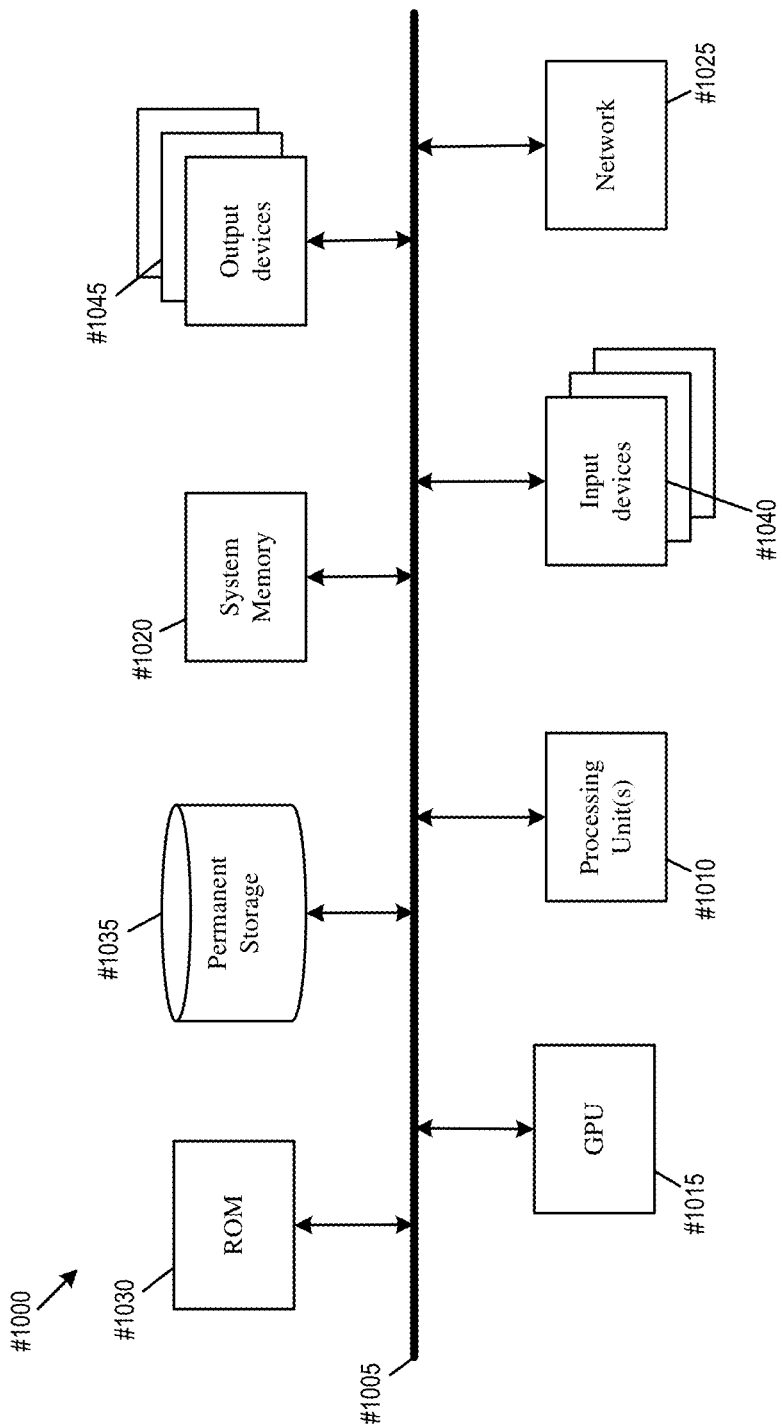
FIG. #10

HARDWARE FRIENDLY CONSTRAINED MOTION VECTOR REFINEMENT

CROSS REFERENCE TO RELATED PATENT APPLICATION(S)

The present disclosure is part of a non-provisional application that claims the priority benefit of U.S. Provisional Patent Application Nos. 62/622,234, 62/723,014, and 62/740,470, filed on Jan. 26, 2018, Aug. 27, 2018, and Oct. 3, 2018, respectively. Contents of above-listed applications are herein incorporated by reference.

TECHNICAL FIELD

The present disclosure relates generally to video processing. In particular, the present disclosure relates to methods for encoding or decoding a block of pixels by decoder-side motion vector refinement (DMVR).

BACKGROUND

Unless otherwise indicated herein, approaches described in this section are not prior art to the claims listed below and are not admitted as prior art by inclusion in this section.

High-Efficiency Video Coding (HEVC) is an international video coding standard developed by the Joint Collaborative Team on Video Coding (JCT-VC). HEVC is based on the hybrid block-based motion-compensated discrete cosine transform (DCT)-like transform coding architecture. The basic unit for compression, termed coding unit (CU), is a 2N×2N square block of pixels, and each CU can be recursively split into four smaller CUs until the predefined minimum size is reached. Each CU contains one or multiple prediction units (PUs). Each PU corresponds to a block of pixels in the CU.

To achieve the best coding efficiency of hybrid coding architecture, HEVC employs intra-prediction and/or inter-prediction modes for each PU. For inter-prediction modes, motion information is used to reconstruct temporal reference frames, which are used to generate motion compensated predictions. Motion information may include motion vectors, motion vector predictors, motion vector differences, reference indices for selecting reference frames, etc.

There are three types of inter-prediction modes: skip mode, merge mode, and advanced motion vector prediction (AMVP) mode. When a PU is coded in AMVP mode, motion vectors (MVs) used for motion-compensated prediction of the PU are derived from motion vector predictors (MVPs) and motion vector differences (MVDs, or residual motion data) according to MV=MVP+MVD. An index that identifies the MVP selection is encoded and transmitted along with the corresponding MVD as motion information. When a PU is coded in either skip mode or merge mode, no motion information is transmitted except the merge index of the selected candidate. Skip mode and merge mode utilize motion inference methods (MV=MVP+MVD where MVD is zero) to obtain the motion information from spatially neighboring blocks (spatial candidates) or collocated blocks in temporally neighboring pictures (temporal candidates) that are selected from reference frame list List0 or List1 (indicated in slice header). In the case of a skip PU, the residual signal for the block being coded is also omitted. To relay motion information for a pixel block under HEVC by using AMVP, merge mode, or skip mode, an index is used to select an MVP (or motion predictor) from a list of candidate motion predictors. In merge/skip mode, a merge index is used to select an MVP from a list of candidate motion predictors that includes four spatial candidates and one temporal candidate. The merge index is transmitted, but motion predictors are not transmitted.

SUMMARY

The following summary is illustrative only and is not intended to be limiting in any way. That is, the following summary is provided to introduce concepts, highlights, benefits and advantages of the novel and non-obvious techniques described herein. Select and not all implementations are further described below in the detailed description. Thus, the following summary is not intended to identify essential features of the claimed subject matter, nor is it intended for use in determining the scope of the claimed subject matter.

Some embodiments of the disclosure provide a video codec that encodes or decodes video sequences using decoder-side motion vector refinement. The video codec identifies a first motion vector and a second motion vector for coding a current block of pixels of a current video frame in the video sequence. The video codec determines whether to perform motion vector refinement for the current block of pixels based on a comparison between a size of the current block of pixels and a threshold. When motion vector refinement is performed, the video codec refines the first and second motion vectors to minimize a distortion cost and codes the current block of pixels by using the refined first and second motion vectors. When motion vector refinement is not performed, the video codec codes the current block of pixels by using the identified first and second motion vectors. In some embodiments, the distortion cost is computed based on sub-sampled pixel data pointed at by the first and second motion vectors. The size of the current block may be a specified as a linear dimension (e.g., height or width) of the current block or as an area of the current block.

In some embodiments, when a size of the current block of pixels is larger than a threshold, the video codec (i) partitioning the current block of pixels into a plurality of partitioned units, (ii) refining the first and second motion vectors for the plurality of partitioned units individually, and (iii) coding the plurality of sub-blocks individually by using the refined motion vectors.

BRIEF DESCRIPTION OF THE DRAWINGS

The accompanying drawings are included to provide a further understanding of the present disclosure, and are incorporated in and constitute a part of the present disclosure. The drawings illustrate implementations of the present disclosure and, together with the description, serve to explain the principles of the present disclosure. It is appreciable that the drawings are not necessarily in scale as some components may be shown to be out of proportion than the size in actual implementation in order to clearly illustrate the concept of the present disclosure.

FIG. #01 shows a diagram of an electronic system that uses PMVD and DMVR for video coding according to an embodiment of the disclosure.

FIG. #02a-b conceptually illustrates using bi-prediction PMVD and DMVR to encode or decode a block of pixels, consistent with an exemplary embodiment of the disclosure.

FIG. #03 conceptually illustrates using template matching and DMVR to encode or decode a block of pixels, consistent with an exemplary embodiment of the disclosure.

FIG. #04 conceptually illustrates an alternative bilateral matching and DMVR process to encode or decode a block of pixels.

FIG. #05 illustrates an example video encoder that may use PMVD and DMVR to encode pixel blocks.

FIG. #06 illustrates portions of the video encoder that implement PMVD and DMVR.

FIG. #07 illustrates an example video decoder that may use PMVD and DMVR to decode and reconstruct pixel blocks.

FIG. #08 illustrates portions of the video decoder that implement PMVD and DMVR.

FIG. #09a-b conceptually illustrates a process that a video codec (encoder or decoder) uses to implement PMVD and DMVR when encoding or decoding a block of pixels of a video frame.

FIG. #10 conceptually illustrates an electronic system with which some embodiments of the present disclosure are implemented.

DETAILED DESCRIPTION

In the following detailed description, numerous specific details are set forth by way of examples in order to provide a thorough understanding of the relevant teachings. Any variations, derivatives and/or extensions based on teachings described herein are within the protective scope of the present disclosure. In some instances, well-known methods, procedures, components, and/or circuitry pertaining to one or more example implementations disclosed herein may be described at a relatively high level without detail, in order to avoid unnecessarily obscuring aspects of teachings of the present disclosure.

I. PMVD and DMVR

Pattern-based Motion Vector Derivation (PMVD) is a method that derives a temporal motion vector predictor (MVP) from existing motion vectors (MVs) of reference frames. Similar to a block coded in skip and merge mode, a block coded by PMVD does not require motion information to be transmitted from the video encoder to the video decoder. Instead, the decoder searches the available reference frames for suitable motion vectors that can be used to reconstruct the block. PMVD is a form of frame rate up-conversion (FRUC), which allows the motion information of a block to be derived at the decoder without signaling from the encoder.

A decoder may perform PMVD by examining a set of candidate motion vectors to select an initial motion vector, and then performs decoder side motion vector refinement (DMVR) by searching around the region pointed at by the initial motion vector for a reference pixel set that has a smallest matching cost or distortion cost. The result of the search is a refined motion vector that is then used to decode the block. The decoder may perform a second stage DMVR by refining the motion vector further for each sub-block of the block.

DMVR is a technique used in video coding (encoding/decoding) to refine motion vectors for a current block of pixels without transmission of additional information (e.g., syntax elements). However, DMVR can increase the amount of computation workload and increase processing time. In some embodiments, in order to ensure that the video quality improvement by DMVR is justified by the increase of processing time, DMVR is skipped or partially performed based on certain properties or characteristics of the current block.

In some embodiments, PMVD and DMVR are used to derive and refine two motion vectors for bidirectional inter-prediction (or bi-prediction) of the current block. The current block in the present frame is coded by a first motion vector that points to a first reference pixel set in a first reference frame and a second motion vector that points to a second reference pixel set in a second reference frame. The current block is predicted by a combination of the first reference pixel set and the second reference pixel set. The PMVD and DMVR techniques are used to identify and refine the first and second motion vectors so that the distortion cost of using the combination of the first and second reference pixel sets to reconstruct the current block is minimal.

FIG. #01 shows a diagram of an electronic system #0100 that uses PMVD and DMVR for video coding according to an embodiment of the disclosure. The electronic system #0100 includes multiple electronic devices that use various coding (encoding/decoding) techniques, such as inter-prediction coding techniques, intra prediction coding techniques, and the like, to efficiently deliver video among the plurality of electronic devices. In the example of FIG. #01, the electronic system #0100 includes a first device #0110 and a second device #0160. The video is encoded at the first device #0110, and the coded video is transmitted in a bitstream #0150 from the first device #0110 to the second device #0160 to be decoded. The first device #0110 and/or the second device #0160 may apply PMVD and DMVR as part of merge mode for inter-frame bi-prediction. DMVR may be terminated early, fully skipped, or partially performed at the first device #0110 and/or at the second device #0160.

The electronic devices in the electronic system #0100 can be any suitable devices. In an example, the first device #0110 is multi-media capture device, such as a video recorder, a camera, a smart phone, a tablet computer, a laptop computer, a desktop computer, and the like configured to generate video frames and encode the video frames into coded video; and the second device #0160 is a multi-media play device, such as a television, a projector, a smart phone, a tablet computer, a laptop computer, a desktop computer and the like configured to decode the coded video to construct decoded video frames and display the decoded video frames.

In some embodiments, the first device #0110 is coupled to a multi-media capture device (not shown) that generates video frames, and the first device #0110 receives the video frames from the multi-media capture device and encodes the video frames. In another example, the second device #0160 is coupled to a multi-media play device (not shown), and the second device #0160 decodes the coded video to construct the decoded video frames and provides the decoded video frames to the multi-media play device for play.

In the example of FIG. #01, the first device #0110 transmits the coded video in a bitstream to the second device #0160 via any suitable communication channel according to one or more communication standards, such as a cable, a local area network (LAN), a wireless LAN (WLAN), a cellular network, an optical network, Internet, or any combination of the above. In an example, the bitstream is carried in electrical signals and transmitted via a cable. In another example, the bitstream is carried in packets, and the packets are transmitted by electrical signals in an LAN. In another example, the packets can be carried by radio frequency signals, for example, in a WLAN, or a cellular network.

According to an aspect of the disclosure, the first device #0110 includes encoder circuitry #0120. The encoder circuitry #0120 is configured to encode video according to a video coding standard (e.g., HEVC) and to generate the bitstream #0150 of coded video. The bitstream is transmitted by the first device #0110 and/or other devices (not shown) in any suitable format. The second device #0160 includes a decoder circuitry #0170. The decoder circuitry #0170 is configured to receive a bitstream of coded video and to decode the bitstream #0150 to generate the decoded video frames according to a video coding standard. An example video encoder implemented by the encoder circuitry #0120 will be described in Section II below. An example video decoder implemented by the decoder circuitry #0170 will be described in Section III below.

Further, the encoder circuitry #0120 uses PMVD and DMVR in the merge mode for inter-frame bi-prediction during encoding, and the decoder circuitry #0170 uses PMVD DMVR in the merge mode for inter-frame bi-prediction during decoding. The DMVR can be selectively terminated early or disabled for blocks that fail to meet certain conditions, such as being larger or smaller than a threshold size. For the system #0100, the encoder circuitry #0120 includes an inter encoder #0130 configured to apply PMVD and DMVR in the merge mode for inter-frame bi-prediction. The inter encoder #0130 is an inter-prediction module that includes a pattern matching engine #0140 and a refinement control #0145. The pattern matching engine #0140 is configured to identify or search for motion vectors based on distortion costs for PMVD and DMVR. The refinement control #0145 is configured to selectively terminate or bypass the DMVR before the DMVR is fully performed or configured to disable the DMVR for the blocks that fail to meet certain conditions.

Similarly, the decoder circuitry #0170 includes an inter decoder #0180 that is configured to apply DMVR in the merge mode for inter-frame bi-prediction. The inter decoder #0180 is an inter-prediction module that includes a pattern matching engine #0190 and refinement controller #0195. The pattern matching engine #0190 is configured to search or identify motion vectors based on distortion costs for PMVD and DMVR. The refinement controller #0195 is configured to selectively terminate the DMVR before the DMVR is fully performed or configured to disable the DMVR for the blocks failed to meet certain conditions. These various conditions will be further described in Section IV below.

It is noted that the encoder circuitry #0120 and the decoder circuitry #0170 can be implemented using any suitable technique. In an embodiment, the encoder circuitry #0120 and the decoder circuitry #0170 are implemented using integrated circuits (ICs). In another example, the encoder circuitry #0120 and the decoder circuitry #0170 are implemented using one or more processors that execute software instructions. It is also noted that the first device #0110 and the second device #0160 can include other suitable components. For example, the first device #0110 can include a video decoder (not shown), and the second device #0160 can include an encoder (not shown).

FIG. #02a-b conceptually illustrates using bi-prediction PMVD and DMVR to encode or decode a block of pixels, consistent with an exemplary embodiment of the disclosure. The figure shows a present frame #0210 (or current frame) for encoding/decoding, a first reference frame #0220 (ref0) that is prior to the present frame #0210 in a video sequence, and a second reference frame #0230 (ref1) that is after the present frame #0210 in the video sequence. It is noted that the number of frames between the first reference frame #0220 and the present frame #0210 can be different from the number of frames between the present frame #0210 and the second reference frame #0230.

The present frame #0210 includes a block #0211 that is currently being coded (the current block) using bilateral matching, which is a form of bi-prediction PMVD. The current block #0211 may be a CU of HEVC. An inter-prediction module (e.g., the inter encoder #0130 or the inter decoder #0180) performs PMVD for the block #0211 by refining two motion vectors MV1 and MV0. As illustrated in FIG. #02a, the first motion vector MV0 points to a first reference pixel set #0221 in the first reference frame #0220, and the second motion vector MV1 points to a second reference pixel set #0231 in the second reference frame #0230. MV0 is a temporal derived List0 MVP and MV1 is a temporal derived List1 MVP. The refined MV0 (denoted MV0') points to a first relocated reference pixel set #0225. The refined MV1 (denoted MV1') points to a second relocated reference pixel set #0235.

To derive a List0 temporal derived MVP, a List0 MV in the List0 reference frame is scaled to the current frame as MV0. The List0 MV is further scaled to point to the reference picture whose refIdx is 0 in List0 as a MV0 mirror. Analogous procedure is used to derive a List1 temporal derived MVP that includes MV1 and a MV1 mirror. The scaling of a MV from one reference frame in List0 or List1, crossing the current frame, to another reference frame, is along a same motion trajectory. MV0 and MV0 mirror are in the same motion trajectory that crosses the current block #0211. MV1 and MV1 mirror are also in the same motion trajectory that crosses the current block #0211.

The current block may have multiple candidate temporal derived MVPs. The candidate temporal derived MVPs may be derived from a predefined set of candidate motion vectors, e.g., candidate motion vectors from the merge list of the CU #0211, motion vectors inherited from spatial neighbors of the CU #0211 in the present frame #0210, all motion vectors of all reference frames, etc. In some embodiments, the inter-prediction module selects the MVP with the smallest distortion cost among the candidate temporal derived MVPs. The distortion cost associated with a temporal derived List0 MVP may be computed as the difference between the reference pixel sets pointed at by the two MVs of the List0 temporal derived MVP (e.g., MV0 and MV0 mirror). The distortion cost associated with a temporal derived List1 MVP may be computed as the difference between the reference pixel sets pointed at by the two MVs of the List1 temporal derived MVP (e.g., MV1 and MV1 mirror). The differences may be measured by a sum of absolute differences (SAD) or by a sum of squared differences (SSD) at a pixel level.

As illustrated in FIG. #02b, the search produces a refined MV0 (denoted as MV0') and a refined MV1 (denoted as MV1') that minimizes the distortion costs of MV0 and MV1. Before refinement, the distortion cost of MV0 is computed as the difference between the first reference pixel set #0221 indicated by MV0 and a reference pixel set #0222 indicated by the MV0 mirror, and the distortion cost of MV1 is computed as the difference between the second reference pixel set #0231 indicated by MV1 and a reference pixel set #0232 indicated by the MV1 mirror. After refinement, the distortion cost of the MV0' is computed as the difference between the first relocated reference pixel set #0225 indicated by MV0' and a reference pixel set #0226 indicated by the MV0' mirror. The distortion cost of the MV1' is computed as the difference between the second relocated reference pixel set #0235 indicated by MV1' and a reference pixel set #0236 indicated by the MV1' mirror.

In some embodiments, the inter-prediction module performs the bilateral matching in two stages. The first stage is block-level (e.g., PU-level or CU-level) matching, and the second stage is the sub-block-level (e.g., sub-PU-level) matching.

For the first stage PU-level (block-level) matching, several starting MV pairs from List0 and List1 temporal derived MVPs are selected respectively. The inter-prediction module calculates a distortion cost for each MV pair (e.g., SAD or SSD between the reference pixel sets pointed at by the MV pair). The MV pair with the smallest distortion cost is selected for the block (e.g., as MV0 and MV1). A diamond search is then performed to refine the selected MV pair. In some embodiments, the refinement precision is ⅛-pel, and the refinement search range is restricted within ±1 pixel. The final refined MV pair is identified as the block-level derived MV pair.

For the second stage sub-PU-level (or sub-block-level) searching, the current PU is divided into sub-PUs. The depth of sub-PU is signaled in SPS (e.g. 3). Minimum sub-PU size is 4×4 pixels. For each sub-PU, several starting MVs are selected from List0 and List1, which may include MVs of PU-level derived MV, zero MV, HEVC collocated TMVP of current sub-PU and bottom-right block, temporal derived MVP of current sub-PU, and MVs of left and above PUs/sub-PUs. By using the similar mechanism in PU-level searching, the best MV pair for each sub-PU is selected. The diamond search is performed to refine the MV pair of each sub-PU. The motion compensation for each sub-PU is performed to generate the predictor for the sub-PU.

In some embodiments, instead of performing bilateral matching to search for suitable reference pixel sets along a motion trajectory, the inter-prediction module (inter encoder #0130 or inter decoder #0180) performs template matching to search for suitable reference pixel sets based on comparison of templates. In this decoder MV derivation method, the template matching is used to generate a MVP for inter mode coding. When a reference picture is selected, the template matching is performed to identify the best template in the selected reference picture. The MV that corresponds to the identified template is the derived MVP. This MVP is inserted into the first position in AMVP.

FIG. #03 conceptually illustrates using template matching and DMVR to encode or decode a block of pixels, consistent with an exemplary embodiment of the disclosure. The figure shows a present frame #0310 (or current frame) for encoding/decoding, a first reference frame #0320 that is prior to the present frame #0310 in a video sequence, and a second reference frame #0330 that is after the present frame #0310 in the video sequence. It is noted that the number of frames between the first reference frame #0320 and the present frame #0310 can be different from the number of frames between the present frame #0310 and the second reference frame #0330.

For template matching merge mode, the reconstructed pixels of above 4 rows and left 4 columns are used to form a template. The template matching is performed to find the best matched template with its corresponding MV. In the example of FIG. #03, template #0317 of the current block #0311 includes pixels sets above and to the left of the current block #0311. Reference pixel sets #0321 and #0331 correspond to MV0 and MV1, respectively. Template #0327 and template #0337 are pixel sets above and to the left of reference pixel sets #0321 and #0331 and are used for matching with the template #0317.

Two-stage matching is also applied for template matching. For the first stage PU-level matching, several starting MVs from List0 and List1 are selected respectively. These MVs include the MVs from merge candidates and MVs from temporal derived MVPs. Two different staring MV sets are generated for two lists. For each MV in one list, the SAD cost of the template with the MV is calculated. The MV with the smallest cost is the best MV. Then, the diamond search is performed to refine the MV. The refinement precision is ⅛-pel. The refinement search range is restricted within ±1 pixel. The final MV is the PU-level derived MV. The MVs in List0 and List1 are generated independently. In the example of FIG. #03, MV0' and MV1' are refined versions of MV0 and MV1 based on search for templates with the lowest SAD costs.

For the second stage sub-PU-level searching, the current PU is divided into sub-PUs. The depth of sub-PU is signaled in SPS (e.g. 3). Minimum sub-PU size is 4×4 block. For each sub-PU at left or top PU boundaries, several starting MVs in List0 and List1 are selected, which includes MVs of PU-level derived MV, zero MV, HEVC collocated TMVP of current sub-PU and bottom-right block, temporal derived MVP of current sub-PU, and MVs of left and above PUs/sub-PUs. By using the similar mechanism in PU-level searching, the best MV pair for the sub-PU is selected. The diamond search is performed to refine the MV pair. The motion compensation for this sub-PU is performed to generate the predictor for this sub-PU. For those PUs which are not at left or top PU boundaries, the second stage, sub-PU-level searching, is not applied, and the corresponding MVs are set equal to the MVs in the first stage.

FIG. #04 conceptually illustrates an alternative bilateral matching and DMVR process to encode or decode a block of pixels, consistent with an exemplary embodiment of the disclosure. The distortion cost is based on calculation of mean removed sum of absolute differences (MRSAD) between predictions of both reference pictures (ref0 and ref1) located at opposite sides of the current picture temporally. In the example, the difference is calculated based on a first reference pixel set indicated by a first motion vector MV0 and a second reference pixel set indicated by a second motion vector MV1.

During integer precision search, 6 points are checked, which are chosen according to an adaptive search pattern method. After integer search process is completed the half sample precision search is to be done if half-pel search is enabled. In the half sample search only 4 points are to be checked (in a plus sign shape). In some embodiments, the search pattern is applied in Merge and Skip modes if the following condition is true:

(POC−POC0)*(POC−POC1)<0, where POC is the picture order count of current to be encoded picture, POC0 and POC1 are picture order counts of the reference pictures (ref0 and ref1) for the current picture. The signaled merge candidate pair is used as input to DMVR process and are denoted initial motion vectors (MV0, MV1). The search points that are searched by DMVR obey the motion vector difference mirroring condition. In other words, any point that is checked by DMVR, denoted by candidate motion vector pair (MV0', MV1') obey the following two equations:

$$MV0'=MV0+MV_{diff}$$

$$MV1'=MV1-MV_{diff}$$

where $MV_{diff}$ represents the points in the search space in one of the reference pictures. After the construction of the search space, unilateral predictions are constructed using regular 8-tap DCTIF interpolation filter. Bilateral matching cost function is calculated by using MRSAD between the two predictions and the search point resulting in the minimum cost is selected as the refined MV pair (MV0' and MV1'). The distortion cost is computed based on a difference between a first reference pixel set in a first reference frame indicated by the refined first motion vector (MV0') and a second reference pixel set in a second reference frame indicated by the refined second motion vector (MV1'), and the refined first motion vector (MV0') and the refined second motion vector (MV1') are based on opposite search positions relative to a central search position.

For the MRSAD calculation, 16-bit precision samples are used to match the output of the interpolation filtering. In some embodiments, no clipping and no rounding operations are applied before MRSAD calculation in order to reduce internal buffer requirement. The integer precision search points are chosen by an adaptive pattern method. As illustrated in FIG. #04, an initial cost that corresponds to central points (P0) of ref0 and ref1 (pointed at by the initial motion vectors MV0 and MV1) is first calculated. Additional 4 costs correspond to pixel positions in plus sign shape (P1-P4) is calculated by predictions located at the opposite sides of the central point. A last point (P5) is chosen based on the gradient of the previous calculated costs. The output of the DMVR process is the refined motion vector pair corresponding to the minimal cost.

If after one iteration the minimum cost is achieved at the central point of the search space, i.e. the motion vectors are not changed, the refinement process is terminated. Otherwise, the point with the minimal cost is regarded as the center for further search process as long as the search range is not exceeded.

Half sample precision search is applied only if application of half-pel search does not exceed the search range. In these instances, only 4 MRSAD calculations are performed, corresponding to plus shape points around a central point, which is chosen based on the minimal cost during the integer precision search. The DMVR process outputs a refined motion vector pair that correspond to the minimal cost point at the end of the search.

II. Example Video Encoder

FIG. #05 illustrates an example video encoder #0500 that may use PMVD and DMVR to encode pixel blocks. As illustrated, the video encoder #0500 receives input video signal from a video source #0505 and encodes the signal into bitstream #0595. The video encoder #0500 has several components or modules for encoding the signal from the video source #0505, including a transform module #0510, a quantization module #0511, an inverse quantization module #0514, an inverse transform module #0515, an intra-picture estimation module #0520, an intra-prediction module #0525, a motion compensation module #0530, a motion estimation module #0535, an in-loop filter #0545, a reconstructed picture buffer #0550, a MV buffer #0565, and a MV prediction module #0575, and an entropy encoder #0590. The motion compensation module #0530 and the motion estimation module #0535 are part of an inter-prediction module #0540.

In some embodiments, the modules #0510-#0590 are modules of software instructions being executed by one or more processing units (e.g., a processor) of a computing device or electronic apparatus. In some embodiments, the modules #0510-#0590 are modules of hardware circuits implemented by one or more integrated circuits (ICs) of an electronic apparatus. Though the modules #0510-#0590 are illustrated as being separate modules, some of the modules can be combined into a single module.

The video source #0505 provides a raw video signal that presents pixel data of each video frame without compression. A subtractor #0508 computes the difference between the raw video pixel data of the video source #0505 and the predicted pixel data #0513 from the motion compensation module #0530 or intra-prediction module #0525. The transform #0510 converts the difference (or the residual pixel data or residual signal #0509) into transform coefficients (e.g., by performing Discrete Cosine Transform, or DCT). The quantization module #0511 quantizes the transform coefficients into quantized data (or quantized coefficients) #0512, which is encoded into the bitstream #0595 by the entropy encoder #0590.

The inverse quantization module #0514 de-quantizes the quantized data (or quantized coefficients) #0512 to obtain transform coefficients, and the inverse transform module #0515 performs inverse transform on the transform coefficients to produce reconstructed residual #0519. The reconstructed residual #0519 is added with the predicted pixel data #0513 to produce reconstructed pixel data #0517. In some embodiments, the reconstructed pixel data #0517 is temporarily stored in a line buffer (not illustrated) for intra-picture prediction and spatial MV prediction. The reconstructed pixels are filtered by the in-loop filter #0545 and stored in the reconstructed picture buffer #0550. In some embodiments, the reconstructed picture buffer #0550 is a storage external to the video encoder #0500. In some embodiments, the reconstructed picture buffer #0550 is a storage internal to the video encoder #0500.

The intra-picture estimation module #0520 performs intra-prediction based on the reconstructed pixel data #0517 to produce intra prediction data. The intra-prediction data is provided to the entropy encoder #0590 to be encoded into bitstream #0595. The intra-prediction data is also used by the intra-prediction module #0525 to produce the predicted pixel data #0513.

The motion estimation module #0535 performs inter-prediction by producing MVs to reference pixel data of previously decoded frames stored in the reconstructed picture buffer #0550. These MVs are provided to the motion compensation module #0530 to produce predicted pixel data.

Instead of encoding the complete actual MVs in the bitstream, the video encoder #0500 uses MV prediction to generate predicted MVs, and the difference between the MVs used for motion compensation and the predicted MVs is encoded as residual motion data and stored in the bitstream #0595.

The MV prediction module #0575 generates the predicted MVs based on reference MVs that were generated for encoding previously video frames, i.e., the motion compensation MVs that were used to perform motion compensation. The MV prediction module #0575 retrieves reference MVs from previous video frames from the MV buffer #0565. The video encoder #0500 stores the MVs generated for the current video frame in the MV buffer #0565 as reference MVs for generating predicted MVs.

The MV prediction module #0575 uses the reference MVs to create the predicted MVs. The predicted MVs can be computed by spatial MV prediction or temporal MV prediction. The difference between the predicted MVs and the motion compensation MVs (MC MVs) of the current frame (residual motion data) are encoded into the bitstream #0595 by the entropy encoder #0590.

The entropy encoder #0590 encodes various parameters and data into the bitstream #0595 by using entropy-coding techniques such as context-adaptive binary arithmetic coding (CABAC) or Huffman encoding. The entropy encoder #0590 encodes parameters such as quantized transform data and residual motion data into the bitstream #0595. The bitstream #0595 is in turn stored in a storage device or transmitted to a decoder over a communications medium such as a network.

The in-loop filter #0545 performs filtering or smoothing operations on the reconstructed pixel data #0517 to reduce the artifacts of coding, particularly at boundaries of pixel blocks. In some embodiments, the filtering operation performed includes sample adaptive offset (SAO). In some embodiment, the filtering operations include adaptive loop filter (ALF).

FIG. #06 illustrates portions of the video encoder #0500 that implement PMVD and DMVR. Specifically, the figure illustrates the components of the inter-prediction module #0540 of the video encoder #0500. For some embodiments, the inter-prediction module #0540 of the video encoder #0500 implements the inter encoder #0130. As illustrated, the inter-prediction module #0540 retrieves candidate motion vectors from the MV buffer #0565 and searches the content of the reconstructed picture buffer #0550 to generate a MV pair for bi-prediction of the current block.

The inter-prediction module #0540 includes the motion compensation module #0530, the motion estimation module #0535, a MV selector #0605, a refinement control #0610, a pattern matching engine #0620, a search buffer #0630, and a distortion cost calculator #0640. The MV selector #0605 retrieves candidate motion vectors from the MV buffer #0565 and provide the candidates to the pattern matching engine #0620. The pattern matching engine #0620 in turn generates a MV pair (MV0 and MV1) for the current block according to bilateral matching or template matching. The pattern matching engine #0620 may also generate a MV pair for each sub-block of the current block during sub-block MV refinement. The MV pair is used to retrieve pixel data from the search buffer #0630, which stores temporary content selectively retrieved from the reconstructed picture buffer #0550. In some embodiments, the search buffer #0630 is implemented by an internal memory device of the video encoder #0500, while the reconstructed picture buffer #0550 may be an external memory device outside of the video encoder #0500. The internal memory device may have significantly less capacity than the external memory device.

The pixel data retrieved from the search buffer #0630 are used to compute the distortion costs associated with the MV pair by the distortion cost calculator #0640. The retrieved pixel data may correspond to reference pixel sets that are along a same motion trajectory as the current block or have matching templates as the current block. The computed distortion cost (e.g., SSD or SAD) may be used by the pattern matching engine #0620 to identify the MV pair with the lowest distortion cost. The identified MV pair is provided to the motion compensation module #0530 to reconstruct the current block.

In some embodiments, the inter-prediction module #0540 sub-samples the pixel data when computing the distortion cost, by e.g., only considering a predefined subset of the pixel data such as odd or even numbered lines. In some embodiments, the data stored in the search buffer is sub-sampled so that the size of the internal memory implementing the search buffer #0630 can be reduced. In some embodiments, the output of the search buffer #0630 is sub-sampled so the number of computations for SSD or SAD at the distortion cost calculator #0640 can be reduced.

The refinement control #0610 determines whether to enable or disable a particular stage of MV refinement of DMVR based on certain conditions, such as whether the size, height, or width of the CU is larger than a threshold. These conditions will be further described in Section IV below. These conditions may be determined at the motion estimation module #0535 based on factors such as rate-distortion trade off.

III. Example Video Decoder

FIG. #07 illustrates an example video decoder #0700 that may use PMVD and DMVR to decode and reconstruct pixel blocks. As illustrated, the video decoder #0700 is an image-decoding or video-decoding circuit that receives a bitstream #0795 and decodes the content of the bitstream into pixel data of video frames for display. The video decoder #0700 has several components or modules for decoding the bitstream #0795, including an inverse quantization module #0705, an inverse transform module #0715, an intra-prediction module #0725, a motion compensation module #0730, an in-loop filter #0745, a decoded picture buffer #0750, a MV buffer #0765, a MV prediction module #0775, and a parser #0790. The motion compensation module #0730 is part of an inter-prediction module #0740.

In some embodiments, the modules #0710-#0790 are modules of software instructions being executed by one or more processing units (e.g., a processor) of a computing device. In some embodiments, the modules #0710-#0790 are modules of hardware circuits implemented by one or more ICs of an electronic apparatus. Though the modules #0710-#0790 are illustrated as being separate modules, some of the modules can be combined into a single module.

The parser #0790 (or entropy decoder) receives the bitstream #0795 and performs initial parsing according to the syntax defined by a video-coding or image-coding standard. The parsed syntax element includes various header elements, flags, as well as quantized data (or quantized coefficients) #0712. The parser #0790 parses out the various syntax elements by using entropy-coding techniques such as context-adaptive binary arithmetic coding (CABAC) or Huffman encoding.

The inverse quantization module #0705 de-quantizes the quantized data (or quantized coefficients) #0712 to obtain transform coefficients, and the inverse transform module #0715 performs inverse transform on the transform coefficients #0716 to produce reconstructed residual signal #0719. The reconstructed residual signal #0719 is added with predicted pixel data #0713 from the intra-prediction module #0725 or the motion compensation module #0730 to produce decoded pixel data #0717. The decoded pixels data are filtered by the in-loop filter #0745 and stored in the decoded picture buffer #0750. In some embodiments, the decoded picture buffer #0750 is a storage external to the video decoder #0700. In some embodiments, the decoded picture buffer #0750 is a storage internal to the video decoder #0700.

The intra-prediction module #0725 receives intra-prediction data from bitstream #0795 and according to which, produces the predicted pixel data #0713 from the decoded pixel data #0717 stored in the decoded picture buffer #0750. In some embodiments, the decoded pixel data #0717 is also stored in a line buffer (not illustrated) for intra-picture prediction and spatial MV prediction.

In some embodiments, the content of the decoded picture buffer #0750 is used for display. A display device #0755 either retrieves the content of the decoded picture buffer #0750 for display directly, or retrieves the content of the decoded picture buffer to a display buffer. In some embodiments, the display device receives pixel values from the decoded picture buffer #0750 through a pixel transport.

The motion compensation module #0730 produces predicted pixel data #0713 from the decoded pixel data #0717 stored in the decoded picture buffer #0750 according to motion compensation MVs (MC MVs). These motion compensation MVs are decoded by adding the residual motion data received from the bitstream #0795 with predicted MVs received from the MV prediction module #0775.

The MV prediction module #0775 generates the predicted MVs based on reference MVs that were generated for decoding previous video frames, e.g., the motion compensation MVs that were used to perform motion compensation. The MV prediction module #0775 retrieves the reference MVs of previous video frames from the MV buffer #0765. The video decoder #0700 stores the motion compensation MVs generated for decoding the current video frame in the MV buffer #0765 as reference MVs for producing predicted MVs.

The in-loop filter #0745 performs filtering or smoothing operations on the decoded pixel data #0717 to reduce the artifacts of coding, particularly at boundaries of pixel blocks. In some embodiments, the filtering operation performed includes sample adaptive offset (SAO). In some embodiment, the filtering operations include adaptive loop filter (ALF).

FIG. #08 illustrates portions of the video decoder #0700 that implement PMVD and DMVR. Specifically, the figure illustrates the components of the inter-prediction module #0740 of the video decoder #0700. For some embodiments, the inter-prediction module #0740 of the video decoder #0700 implements the inter decoder #0180. As illustrated, the inter-prediction module #0740 retrieves candidate motion vectors from the MV buffer #0765 and searches the content of the decoded picture buffer #0750 to generate a MV pair for bi-prediction of the current block.

The inter-prediction module #0740 includes the motion compensation module #0730, a MV selector #0805, a refinement control #0810, a pattern matching engine #0820, a search buffer #0830, and a distortion cost calculator #0840. The MV selector #0805 retrieves candidate motion vectors from the MV buffer #0765 and provide the candidates to the pattern matching engine #0820. The pattern matching engine #0820 in turn generates a MV pair (MV0 and MV1) for the current block according to bilateral matching or template matching. The pattern matching engine #0820 may also generate a MV pair for each of the sub-blocks during sub-block MV refinement. The MV pair is used to retrieve pixel data from the search buffer #0830, which stores temporary content selectively retrieved from the decoded picture buffer #0750. In some embodiments, the search buffer #0830 is implemented by an internal memory device of the video decoder #0700, while the decoded picture buffer #0750 may be an external memory device outside of the video decoder #0700. The internal memory device may have significantly less capacity than the external memory device.

The pixel data retrieved from the search buffer #0830 are used to compute the distortion costs associated with the MV pair by the distortion cost calculator #0840. The retrieved pixel data may correspond to reference pixel sets that are along a same motion trajectory as the current block or have matching templates as the current block. The computed distortion cost (e.g., SSD or SAD) may be used by the pattern matching engine #0820 to identify the MV pair with the lowest distortion cost. The identified MV pair is provided to the motion compensation module #0730 to reconstruct the current block.

In some embodiments, the inter-prediction module #0740 sub-samples the pixel data when computing distortion cost, by e.g., only considering a predefined subset of the pixel data such as odd or even numbered lines. In some embodiments, the data stored in the search buffer is sub-sampled so that the size of the internal memory implementing the search buffer #0830 can be reduced. In some embodiments, the output of the search buffer #0830 is sub-sampled so the number of computations for SSD or SAD at the distortion cost calculator #0840 can be reduced.

The refinement control #0810 determines whether to enable or disable a particular stage of MV refinement of DMVR based on certain conditions, such as whether the size, height, or width of the CU is larger than a threshold. These conditions will be further described in Section IV below. The refinement control #0810 of the video decoder may determine these conditions based on the content of the bitstream #0795 provided by the parser #0790.

IV. Conditional MV Refinement

In some embodiment, MV refinement is disallowed for the current CU when the CU is larger than a threshold size. If MV refinement is allowed, the inter-prediction module performs a search (e.g., a diamond search or a search described by reference to FIG. #04) to refine the MV pair in a MV searching stage. In some embodiments, if the current CU is larger than the threshold size, the inter-prediction module disables MV horizontal refinement for the CU (though the MV vertical refinement may still be enabled). In some embodiments, if the current CU is larger than the threshold size, the inter-prediction module disables MV vertical refinement for the CU (though the MV horizontal refinement may still be enabled).

In some embodiments, the inter-prediction module (#0540 or #0740) may partition the current CU into multiple smaller partitioned units for the MV searching stage to simplify SSD or SAD calculation. For example, if the size of the current CU is greater than a threshold size, the inter-prediction module partitions the CU into multiple partitioned units and performs MV searching process for each partitioned unit. Conversely, if the size of the current CU is less than the threshold size, the inter-prediction module does not partition the CU and performs the MV searching process for the CU as a whole. For example, if the threshold size is defined as 128×128 and the current CU size is 256×256, the inter-prediction module partitions the CU into 4 partitioned units at size 128×128 each and performs the MV searching process for each partitioned unit.

In some embodiments, the inter-prediction module partitions the current CU into partitioned units and perform MV refinement independently for each partitioned unit if the CU span across a grid unit boundary in the video picture. A grid unit is defined as a grid_width×grid_height rectangular region in a CTU. One CTU can be partitioned into several grid units. If a CU is not fully contained within a grid unit, the inter-prediction module partitions the current CU into several partitioned units and perform MV refinement independently for the partitioned units provided that each partitioned unit fall within one grid unit.

The current CU may include several sub-blocks. The MV refinement process may be applied for each sub-block independently during a sub-block MV refinement stage. The sub-block MV refinement stage requires significant memory bandwidth when searching a target area for refining the MVs for sub-blocks. In order to reduce the memory access, the video codec in some embodiments skips the sub-block MV refinement stage conditionally. That is, the sub-block MV refinement is not always performed. In some embodiments, if the current CU size is smaller than the threshold size, the sub-block MV refinement process is skipped. M×N can be any integers, e.g. 4, 8, 16, and so on.

In some embodiments, the condition to perform the sub-block MV refinement is decided based on motion information, including reference frame selection, prediction direction, or the magnitude of motion vector. For example, in some embodiments, the sub-block MV refinement stage is performed when the reference frame selection is equal to 0 or when the magnitude of motion vector is larger than a threshold.

In some embodiments, the condition to perform the sub-block MV refinement is decided based on a ratio between the current CU size and a neighboring CU size. If the current CU size is much larger than the neighboring CU size, then the sub-block MV refinement is allowed. Otherwise, the sub-block MV refinement for the current CU is disabled. The conditional sub-block MV refinement may be implemented by encoders and/or decoders (at e.g., the inter-prediction module #0540 of the video encoder #0500, and/or the inter-prediction module #0740 of the video decoder #0700).

As mentioned, in determining whether to perform the MV refinement, whether to perform the sub-block MV refinement, or whether to partition the CU during the MV searching stage, the size of the CU is compared with a threshold size. In some embodiments, a CU is regarded as greater than the threshold size if a linear dimension of the CU (e.g., the CU's width or height) is greater than a threshold. Conversely, the CU is regarded as less than the threshold size if the linear dimension of the CU is less than the threshold. In some embodiments, the CU is regarded as greater than the threshold size if the area of the CU is greater than a threshold area, and the CU is regarded as less than the threshold size if the area of the CU is less than the threshold area.

In some embodiments, the CU is compared with a threshold size M×N that is specified by a threshold height (M) and a threshold width (N). The values of M and N can be predefined or signaled at sequence level, picture level or slice level. The values of M and N can also be derived based on video resolution or standard profile. The CU may be regarded as greater than the threshold size if (i) the area of the CU is greater than M×N, (ii) if the height of the CU is greater than M, (iii) if the width of the CU is greater than N, (iv) if the width of the CU is greater than the N and the height of the CU is greater than M, or (v) if the width of the CU is greater than the N or the height of the CU is greater than M.

For a large CU, DMVR process may require more decoder-side operations and more data bit-depth than for a smaller CU. In order to reduce the computation complexity of DMVR for large CUs, the inter-prediction module (#0540 or #0740) may perform the MV refinement process by sub-sampling pixel data when computing distortion cost. For example, the inter-prediction module may use only the differences in the odd rows or even rows to select the best MV for the current CU.

In some embodiments, a video encoder is constrained to not encode two consecutive CUs by MV refinement. For example, if the previous CU of the current CU is encoded by MV refinement due to a rate-distortion decision, the current CU is prevented from being encoded by MV refinement. In some embodiments, bitstream syntax for MV refinement is absent for the current CU whenever the previous CU is encoded by MV refinement.

The encoder may use MV refinement syntax in the bitstream to inform the decoder whether MV refinement is turned on. In some embodiments, the video encoder turns off MV refinement operations, and the MV refinement syntax is signaled as 0 from encoder to decoder. In some embodiments, for large CU (size≥the predefined threshold), the MV refinement syntax is eliminated from the bitstream, and the decoder automatically turns off MV refinement based on the size of the CU, thereby saving at least a bit in the bitstream.

FIG. #09a-#09b conceptually illustrates a process that a video codec (encoder or decoder) uses to implement PMVD and DMVR when encoding or decoding a block of pixels of a video frame. In some embodiments, one or more processing units (e.g., a processor) of a computing device implementing the video encoder #0500 or the video decoder #0700 performs the process #0900 by executing instructions stored in a computer readable medium. In some embodiments, an electronic apparatus implementing the video encoder #0500 or the video decoder #0700 performs the process #0900.

As illustrated in FIG. #09a, the video codec receives (at step #0902) the block of pixels of the video frame as the current block to be coded. The block of pixels may come from a raw video to be encoded into a bitstream as a PU or a CU. The block of pixels may also come from a bitstream as a PU or a CU to be decoded into pixel data.

The video codec determines (at step #0904) whether to code the current block using PMVD and DMVR. At a video encoder, a motion estimation process or module may decide whether to use PMVD and DMVR for the current block based on rate-distortion considerations. Whether the current block is coded in PMVD and DMVR may be indicated in the bitstream that encodes the video frame. In some embodiments, the bitstream may include a flag that indicates whether the block is encoded in PMVD and DMVR. In some embodiments, the bitstream may include a flag that indicates whether FRUC mode is used. The decoder receiving the bitstream may use the flag to decide whether to perform PMVD and DMVR. In some embodiments, such a flag is present when the bitstream includes a flag that indicates skip mode or merge mode to be true. If the current block is coded in PMVD and DMVR, the process proceeds to #0908. Otherwise, the process proceeds to #0906.

At step #0906, the video codec uses a mode other than PMVD to encode or decode the current block, coding mode such as merge mode, intra mode, AMVP mode, etc. The process #0900 then ends and the video codec may proceed to encode or decode another block.

At step #0908, the video codec identifies a MV pair for coding a current block of pixels for the current video picture. The MV pair includes a first motion vector that is indicative of a first reference pixel set in a first reference frame and a second motion vector that is indicative of a second reference pixel set in a second reference frame. The video codec may identify the MV pair based on a predefined set of candidate motion vectors, e.g., candidate motion vectors from the merge list of the current block, motion vectors inherited from spatial neighbors of the current block, all motion vectors of all reference frames (List0 and List1), etc. The process then proceeds to #0910.

The video codec determines (at step #0910) whether to turn-off or allow MV refinement for the current block. In some embodiments, an MV refinement syntax element is present in the bitstream, and the decoder may turn-off or allow MV refinement based on the MV refinement syntax element. In some embodiments, if the size of the CU is larger than a threshold size, the video codec turns off MV refinement operation without examining the MV refinement syntax element, and the MV refinement syntax element can be absent from the bitstream. In some embodiments, the encoder does not perform MV refinement, and the MV refinement syntax is absent or set to 0, and the decoder determines whether to turn-off or allow MV refinement based on the size of the CU. In some embodiments, if the previous CU of the current CU is coded with MV refinement, the current CU is prevented from being coded with MV refinement. If MV refinement is turned off for the current block, the process proceeds to #0912. If MV refinement is allowed, the process proceeds to step #0914.

At step #0912, the video codec codes the current block using the identified MV pair without performing MV refinement. The process #0900 then ends and the video codec may proceed to code other blocks.

At step #0914, the video codec performs block-level MV search and refinement for the current block. In some embodiments, the video codec refines the MV pair by performing a diamond search to minimize a distortion cost associated with the MV pair (or the reference pixel sets indicated by the MV pair).

In some embodiments, the distortion cost is computed based on a difference between reference pixel sets indicated by the MV pair (as described by reference to FIG. #04). In some embodiments, the distortion cost is computed based on neighboring pixels of the current block and neighboring pixels of the reference pixel sets indicated by the MV pair (as described by reference to FIG. #03). In some embodiments, the distortion cost is computed based on differences between reference pixel sets indicated by the MV pair and reference pixel sets indicated by the mirrors of the MV pair (as described by reference to FIG. #02).

In some embodiments, the distortion cost is computed by sub-sampling the pixel data pointed at by the MV pair. In some embodiments, if the current CU is larger than a threshold size, the video codec disables MV horizontal refinement for the CU. In some embodiments, if the current CU is larger than a threshold size, the video codec disables MV vertical refinement for the CU. The process then proceeds to #0916.

At step #0916, the video codec determines whether to skip sub-block level MV refinement. In other words, the video codec determines whether the current block meets the condition for performing the sub-block MV refinement stage for the current block. In some embodiments, if the current CU size is smaller than a threshold size, the sub-block MV refinement stage is skipped. In some embodiments, the condition to perform the sub-block MV refinement is decided based on motion information, including reference frame selection, prediction direction, and the magnitude of motion vector. In some embodiments, the condition to perform the sub-block MV refinement is decided based on a ratio between the current CU size and a neighboring CU size. If the current CU size is much larger than the neighboring CU size, then the sub-block MV refinement is allowed. Otherwise, the sub-block MV refinement for the current CU is disabled. If the condition for skipping sub-block level MV refinement is met, the process proceeds to #0920. If the condition for skipping sub-block level MV refinement is not met, the process proceeds to #0918.

At step #0918, the video codec performs sub-block level MV refinement for each sub-block to produce a pair of refined MVs for each sub-block. For each sub-block, the video codec refines the MV pair by performing a diamond search to minimize a distortion cost associated with the MV pair (or the reference pixel sets indicated by the MV pair). In some embodiments, the distortion cost is computed by sub-sampling the pixel data pointed at by the MV pair. The process #0900 then proceeds to #0920.

At step #0920, the video codec encodes or decodes the current block by using the refined MV pair for the block or the refined MV pairs for the sub-blocks or partitioned units to perform inter-prediction. The process #0900 then ends and the video codec may proceed to encode or decode another block of pixels.

In some embodiments, rather than using the size of the current CU to determine whether to perform MV refinement at all, the video codec uses the size of the current CU to determine whether to partition the current CU for MV refinement.

As illustrated in FIG. #09b, after identifying a MV pair for coding the current block at step #0908, the video codec determines (at step #0922) whether to partition the current block into partitioned units for refinement. If the size of current CU size is greater than a threshold the size, the video codec partitions the CU into multiple partitioned units and performs MV searching process for each partitioned unit. Conversely, if the CU size is less than the threshold size, the video codec considers the CU as one partitioned unit and performs MV searching process for the CU as a whole. In some embodiments, the current CU is regarded as greater than a threshold size when a linear dimension of the CU (e.g., CU's height or width) is greater than a threshold. In some embodiments, the current CU is regarded as greater than a threshold size when an area of the CU (e.g., CU's width×height) is greater than a threshold. In some embodiments, a CU is regarded as greater than a threshold size if the CU is not fully contained within a predefined grid unit. In some embodiments, if a CU is not fully contained within a grid unit, the video codec partitions the current CU into several partitioned units and perform MV refinement independently for each partitioned unit, provided that each partitioned unit fall within one grid unit.

If the block is to be partitioned for MV refinement, the process proceeds to #0924. If the block is not to be partitioned for MV refinement, the process proceeds to #0914 to perform MV search and refinement for the current block as a whole by refining the MV pair identified for the current block at step #0908.

At step #0924, the video codec partitions the current block into partitioned units and performs MV search and refinement for each partitioned unit individually. For each partitioned unit, the video codec refines the MV pair by performing a diamond search to minimize a distortion cost associated with the MV pair (or the reference pixel sets indicated by the MV pair). In some embodiments, the distortion cost is computed by sub-sampling the pixel data pointed at by the MV pair. The process #0900 then proceeds to #0920.

In some embodiments, the video codec may determine whether to partition the CU for MV refinement if the video codec has allowed MV refinement for the CU. In these instances, after the video codec has identified a MV pair for coding the current block at step #0908, the process #0900 may proceed to the step #0910 for the video codec to determine whether to turn-off or allow MV refinement for the current block. This transition is illustrated as a dashed line in FIG. #09b. If the video codec allows MV refinement, the process #0900 proceeds to step #0922 to determine whether to partition the block for MV refinement.

V. Example Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random-access memory (RAM) chips, hard drives, erasable programmable read only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the present disclosure. In some embodiments, the software programs, when installed to operate on one or more electronic systems, define one or more specific machine implementations that execute and perform the operations of the software programs.

FIG. #10 conceptually illustrates an electronic system #1000 with which some embodiments of the present disclosure are implemented. The electronic system #1000 may be a computer (e.g., a desktop computer, personal computer, tablet computer, etc.), phone, PDA, or any other sort of electronic device. Such an electronic system includes various types of computer readable media and interfaces for various other types of computer readable media. Electronic system #1000 includes a bus #1005, processing unit(s) #1010, a graphics-processing unit (GPU) #1015, a system memory #1020, a network #1025, a read-only memory #1030, a permanent storage device #1035, input devices #1040, and output devices #1045.

The bus #1005 collectively represents all system, peripheral, and chipset buses that communicatively connect the numerous internal devices of the electronic system #1000. For instance, the bus #1005 communicatively connects the processing unit(s) #1010 with the GPU #1015, the read-only memory #1030, the system memory #1020, and the permanent storage device #1035.

From these various memory units, the processing unit(s) #1010 retrieves instructions to execute and data to process in order to execute the processes of the present disclosure. The processing unit(s) may be a single processor or a multi-core processor in different embodiments. Some instructions are passed to and executed by the GPU #1015. The GPU #1015 can offload various computations or complement the image processing provided by the processing unit(s) #1010.

The read-only-memory (ROM) #1030 stores static data and instructions that are needed by the processing unit(s) #1010 and other modules of the electronic system. The permanent storage device #1035, on the other hand, is a read-and-write memory device. This device is a non-volatile memory unit that stores instructions and data even when the electronic system #1000 is off. Some embodiments of the present disclosure use a mass-storage device (such as a magnetic or optical disk and its corresponding disk drive) as the permanent storage device #1035.

Other embodiments use a removable storage device (such as a floppy disk, flash memory device, etc., and its corresponding disk drive) as the permanent storage device. Like the permanent storage device #1035, the system memory #1020 is a read-and-write memory device. However, unlike storage device #1035, the system memory #1020 is a volatile read-and-write memory, such a random access memory. The system memory #1020 stores some of the instructions and data that the processor needs at runtime. In some embodiments, processes in accordance with the present disclosure are stored in the system memory #1020, the permanent storage device #1035, and/or the read-only memory #1030. For example, the various memory units include instructions for processing multimedia clips in accordance with some embodiments. From these various memory units, the processing unit(s) #1010 retrieves instructions to execute and data to process in order to execute the processes of some embodiments.

The bus #1005 also connects to the input and output devices #1040 and #1045. The input devices #1040 enable the user to communicate information and select commands to the electronic system. The input devices #1040 include alphanumeric keyboards and pointing devices (also called "cursor control devices"), cameras (e.g., webcams), microphones or similar devices for receiving voice commands, etc. The output devices #1045 display images generated by the electronic system or otherwise output data. The output devices #1045 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. #10, bus #1005 also couples electronic system #1000 to a network #1025 through a network adapter (not shown). In this manner, the computer can be a part of a network of computers (such as a local area network ("LAN"), a wide area network ("WAN"), or an Intranet, or a network of networks, such as the Internet. Any or all components of electronic system #1000 may be used in conjunction with the present disclosure.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, many of the above-described features and applications are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the present disclosure has been described with reference to numerous specific details, one of ordinary skill in the art will recognize that the present disclosure can be embodied in other specific forms without departing from the spirit of the present disclosure. In addition, a number of the figures (including FIG. #09) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the present disclosure is not to be limited by the foregoing illustrative details, but rather is to be defined by the appended claims.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method for encoding or decoding a video sequence, the method comprising:
  determining whether to partition the current block of pixels for motion vector refinement based on whether the current block of pixels meet a particular condition;
  when the current block of pixels is partitioned for motion vector refinement:
    partitioning the current block of pixels into a plurality of partitioned units; and
    for every partitioned unit among the plurality of partitioned units;
      identifying a first motion vector and a second motion vector;
      refining the first and second motion vectors;
      computing distortion costs of the refined first motion vector and the refined second motion vector based on a difference between a first reference pixel set in a first reference frame indicated by the refined first motion vector and a second reference pixel set in a second reference frame indicated by the refined second motion vector, respectively, wherein the pixel sets are sub-sampling pixel data of a subset of the pixel data in only odd or even numbered lines of the pixel data according to the refined first and second motion vectors,
      wherein, when a plurality of distortion costs are calculated for the partitioned unit, deriving a minimized distortion cost based on the plurality of distortion costs, and obtaining a corresponding refined first and second motion vectors based on the minimized distortion cost; and
    coding the plurality of partitioned units individually by using the corresponding refined first and second motion vectors;
  when the current block of pixels is not partitioned for motion vector refinement:
    identifying a pair of motion vectors for coding the current block of pixels; and
    coding the current block of pixels by using the identified pair of motion vectors without refining the pair of motion vectors.

2. The method of claim 1, wherein the current block of pixels is partitioned for motion vector refinement when a linear dimension of the current block of pixels is greater than the threshold.

3. The method of claim 1, wherein the current block of pixels is partitioned for motion vector refinement when an area of the current block of pixels is greater than the threshold.

4. The method of claim 1, wherein the current block of pixels is not partitioned for motion vector refinement when the current block of pixels is contained by a predetermined grid unit.

5. The method of claim 1, wherein the distortion cost is computed based on the sub-sampled pixel data pointed at by the first and second motion vectors.

6. The method of claim 1, wherein:
  the first motion vector is indicative of a first reference pixel set in a first reference frame and the second motion vector is indicative of a second reference pixel set in a second reference frame, and
  the distortion cost is computed based on a set of neighboring pixels of the current block of pixels, a set of neighboring pixels of the first reference pixel set, and a set of neighboring pixels of the second reference pixel set.

7. The method of claim 1, wherein the refined first motion vector and the refined second motion vector are based on opposite search positions relative to a central search position.

8. The method of claim 1, further comprising:
  determining whether to perform motion vector refinement for the current block of pixels based on a comparison between a size of the current block of pixels and a threshold;
  When motion vector refinement is performed:
    coding the current block of pixels by using the refined first and second motion vectors; and
  when motion vector refinement is not performed:
    coding the current block of pixels by using the identified first and second motion vectors.

9. The method of claim 1, further comprising:
  calculating an initial cost that corresponds to central points pointed at by the first and second motion vectors;
  calculating additional costs corresponding to pixel positions in plus sign shape via predictions located at opposite sides of a central point;
  determining a last point based on a gradient of previous calculated costs; and
  outputting the first and second refined motion vectors corresponding to the minimal cost.

10. An electronic apparatus comprising:
  circuitry configured to:
    determine whether to partition the current block of pixels for motion vector refinement based on whether the current block of pixels meet a particular condition;
    when the current block of pixels is partitioned for motion vector refinement, the circuitry is further configured to:
      partition the current block of pixels into a plurality of partitioned units; and
      for every partitioned unit among the plurality of partitioned units:
        identify a first motion vector and a second motion vector;
        refine the first and second motion vectors;
        compute distortion costs of the refined first motion vector and the refined second motion vector based on a difference between a first reference pixel set in a first reference frame indicated by the refined first motion vector and a second reference pixel set in a second reference frame indicated by the refined second motion vector, respectively, wherein the pixel sets are sub-sampling pixel data of a subset of the pixel data in only odd or even numbered lines of the pixel data according to the first and second motion vectors,
        wherein, when a plurality of distortion costs are calculated for the partitioned unit, the circuitry is further configured to derive a minimized distortion cost based on the plurality of distortion costs, and obtain a corresponding refined first and second motion vectors based on the minimized distortion cost; and
      code the plurality of partitioned units individually by using the corresponding refined first and second motion vectors;

when the current block of pixels is not partitioned for motion vector refinement, the circuitry is further configured to:
identify a pair of motion vectors for coding the current block of pixels, and
code the current block of pixels by using the identified pair of motion vectors without refining the pair of motion vectors.

* * * * *

UNITED STATES PATENT AND TRADEMARK OFFICE
CERTIFICATE OF CORRECTION

| | |
|---|---|
| PATENT NO. | : 11,310,526 B2 |
| APPLICATION NO. | : 16/248452 |
| DATED | : April 19, 2022 |
| INVENTOR(S) | : Chun-Chia Chen et al. |

It is certified that error appears in the above-identified patent and that said Letters Patent is hereby corrected as shown below:

On the Title Page

Related U.S. Application Data is incorrect. Item (60) should read:
--(60) Related U.S. Application Data: Provisional application No. 62/740,470, filed on Oct. 3, 2018, provisional application No. 62/723,014, filed on Aug. 27, 2018, provisional application No. 62/622,234, filed on Jan. 26, 2018--

Signed and Sealed this
Eighteenth Day of October, 2022

Katherine Kelly Vidal
*Director of the United States Patent and Trademark Office*